United States Patent [19]

Fuelling, Jr. et al.

[11] 4,209,964
[45] Jul. 1, 1980

[54] TWO-SPEED FORWARD AND REVERSE SELF-PROPEL SYSTEM FOR WALK-BEHIND MOWERS

[75] Inventors: William Fuelling, Jr., Galesburg; Richard A. Heismann, Knoxville, both of Ill.

[73] Assignee: Outboard Marine Corporation, Waukegan, Ill.

[21] Appl. No.: 910,573

[22] Filed: May 30, 1978

[51] Int. Cl.$^2$ .................. A01D 69/06; A01D 69/08
[52] U.S. Cl. ........................................ 56/11.2; 56/11.8
[58] Field of Search ............... 56/11.2, 11.1, 11.7, 56/11.8; 74/359

[56] References Cited

U.S. PATENT DOCUMENTS

| | | | |
|---|---|---|---|
| 986,444 | 3/1911 | Cotta | 74/359 |
| 1,048,498 | 12/1912 | Coldwell | 56/11.2 |
| 1,352,293 | 9/1920 | Lovell | 74/359 |
| 1,827,582 | 10/1931 | Jacobs | 74/359 |
| 2,461,027 | 2/1949 | Bodmer | 74/359 |
| 2,636,330 | 4/1953 | Krause | 56/11.2 |
| 2,947,132 | 8/1960 | Shaw | 56/11.1 |
| 3,013,372 | 12/1961 | Basham | 56/11.8 |
| 3,256,681 | 6/1966 | Phelps | 56/11.2 |
| 3,396,519 | 8/1968 | Lehman | 56/11.2 |
| 3,425,292 | 2/1969 | Cadiov | 74/359 |

Primary Examiner—Russell R. Kinsey
Assistant Examiner—Paul J. Hirsch
Attorney, Agent, or Firm—Michael, Best & Friedrich

[57] ABSTRACT

Disclosed herein is a self-propelled lawn mower including a blade housing, a plurality of wheels adapted for supporting the blade housing, at least one of the wheels being adapted to serve as a drive wheel, a blade mounted for rotation within the blade housing, a prime mover supported on the housing, a drive shaft mounted for rotation relative to the housing and adapted for connection to the drive wheel for driving the drive wheel, and a transmission means mounted on the blade housing. The transmission means includes a rotatable first gear drivingly connected to the prime mover, a pair of driven gears rotatably mounted in meshing engagement with the first gear and driven by the first gear in opposite directions, and means for alternatively and selectively connecting the driven gears to the drive shaft for rotatably driving the drive shaft in different rotational directions.

21 Claims, 9 Drawing Figures

TWO-SPEED FORWARD AND REVERSE SELF-PROPEL SYSTEM FOR WALK-BEHIND MOWERS

BACKGROUND OF THE INVENTION

The invention relates generally to self-propelled lawn mowers and more particularly to multi-speed transmissions for self-propelled lawn mowers having forward and reverse drives and to means for shifting such transmissions.

Self-propelled lawn mowers typically are driven by a transmission connected to the cutter blade drive shaft. The transmission generally provides for rotation of the mower drive shaft in only one direction such that the lawn mower is self-propelled in only one direction. Additionally, common methods of providing a self-propel system for a lawn mower require shifting of the transmission with the transmission under load and the power being directly connected to the drive wheels during shifting. Such arrangements cause loading of the transmission components and drive shaft during shifting.

U.S. patent application Ser. No. 872,638 filed Jan. 26, 1978 by Schlapper and assigned to the assignee of the present invention discloses a transmission for a self-propelled power mower including a drive shaft having drive means on its ends, the drive means being engageable with drive wheels to thereby drive the drive wheels of the mower. The drive means include a low-speed drive member mounted on the drive shaft for common rotation therewith and for engaging a drive wheel and a high-speed drive member having an outer diameter greater than the diameter of the low-speed drive member. The high-speed drive member is splined on the low-speed drive member and is selectively and alternatively moved into engagement with the drive wheel.

U.S. Pat. No. 2,947,132, issued Aug. 2, 1960 to Shaw discloses a transmission for a power mower or the like including a drive shaft which is drivingly connected to a prime mover and a pair of the mower wheels selectively movable into frictional engagement with the drive shaft to drive the mower.

U.S. Pat. No. 2,962,854 issued Dec. 6, 1960 to Jepson discloses a two-speed drive gear having concentric rings of gear teeth and a driven gear which is connected to a wheel-engageable drive shaft and can be moved axially to mesh with either of the drive gear rings for varying the mower speed.

U.S. Pat. No. 2,736,389, issued Feb. 28, 1956, U.S. Pat. No. 3,433,002, issued Mar. 18, 1969 and U.S. Pat. No. 3,035,385, issued May 22, 1962 each disclose another alternative means for driving a self-propelled lawn mower.

SUMMARY OF THE INVENTION

The invention provides a self-propelled lawn mower including a blade housing supported on a plurality of wheels, at least one of the wheels being adapted to serve as a drive wheel, a blade mounted for rotation within the blade housing, a prime mover supported on the blade housing, a drive shaft mounted for rotation relative to the blade housing and adapted for connection to the drive wheel for driving the drive wheel, and a transmission mounted on the blade housing. The transmission includes a rotatable gear connected to the prime mover, a pair of driven gears rotatably mounted in meshing engagement with the first gear and driven by the first gear in opposite directions. The transmission further includes means for alternatively and selectively connecting the driven gears to the drive shaft for rotatably driving the drive shaft in different rotational directions.

The invention also provides a guiding handle connected to the blade housing and means for shifting the transmission from forward to reverse mounted on the guiding handle and connected to the means for alternatively and selectively connecting the driven gears to the drive shaft.

Another of the principal features of the invention is the provision of a friction driving roll mounted on the drive shaft for engaging the drive wheel, means on the housing mounting the drive wheel for movement to and from engagement with the friction driving roll, a guiding handle connected to the housing, and means movably mounted on the mower guiding handle and connected to the means mounting the drive wheel for moving the drive wheel to and from engagement with the friction driving roll, and the provision of means for precluding shifting of the transmission until disengagement of the drive wheel and the friction driving roll, the means for precluding shifting being connected to the means for alternatively and selectively connecting the driven gears to the drive shaft and being connected to the means for moving the drive wheel.

Another of the principal features of the invention is the provision of the transmission including means for selectively and alternatively driving the drive shaft at two different speeds.

A further of the principal features of the invention is the provision of a transmission which further includes a second rotatable shaft in relation to which the driven gears are rotatable, means for selectively and alternatively drivingly connecting the driven gears to the second rotatable shaft, and means for selectively and alternatively driving the drive shaft at two different speeds including a second pair of rotatably mounted gears, a first drive gear driven by the second rotatable shaft and driving one of the second pair of gears at a first speed, a second drive gear driven by the second rotatable shaft and driving the other of the pair of gears at a second speed, and means for selectively and alternatively connecting the second pair of gears to the drive shaft for driving the drive shaft.

Other features and advantages of the embodiments of the invention will become apparent to those skilled in the art upon reviewing the following detailed description, the drawings and the appended claims.

Before explaining at least one embodiment of the invention in detail, it is to be understood that the invention is not limited in its application to the details of construction and the arrangements of the components set forth in the following description or illustrated in the drawings. The invention is capable of other embodiments and of being practiced and carried out in various ways. Also, it is to be understood that the phraseology and terminology employed herein is for the purposes of description and should not be regarded as limiting.

DESCRIPTION OF THE PREFERRED EMBODIMENT

Illustrated in the drawings is a self-propelled lawn mower 10 including a prime mover 12, such as an internal combustion engine or an electric motor, partially covered by a shroud 14 and supported on a frame including a blade housing 16. Drivingly connected to the prime mover 12 is an engine drive shaft 17 which drives a rotary cutter blade 18 located inside the blade housing 16. The mower 10 is supported for travel along the ground by a pair of front wheels 20 (one shown) and a pair of rear wheels 21 (one shown) carried on an axle 24 supported rearwardly of the blade housing 16 as described in more detail below. The mower 10 is guided by a guiding handle 23 connected to and extending rearwardly from the blade housing 16.

The mower 10 is powered by a drive mechanism which is operable to selectively connect the prime mover 12 in driving engagement with at least one of the rear wheels 21. In the specific construction illustrated, the vertical drive shaft 17 is provided with a bevel gear 19 thereon and the drive mechanism includes an input shaft 26 having a bevel gear 25 at one end meshing with the bevel gear 19, whereby the vertical drive shaft 17 rotatably drives the input shaft 26. In alternative embodiments the input shaft 26 could also be driven by other driving means such as by a worm and worm gear assembly. The input shaft 26 is drivingly connected to a transverse drive shaft 28 by a transmission means 30 to be described below. The drive shaft 28 is rotatably supported and includes at least one friction drive roll 34 located on at least one end portion of the drive shaft 28 for selectively engaging the outer periphery of the rear wheels 21 for driving the mower 10.

Figure 7:
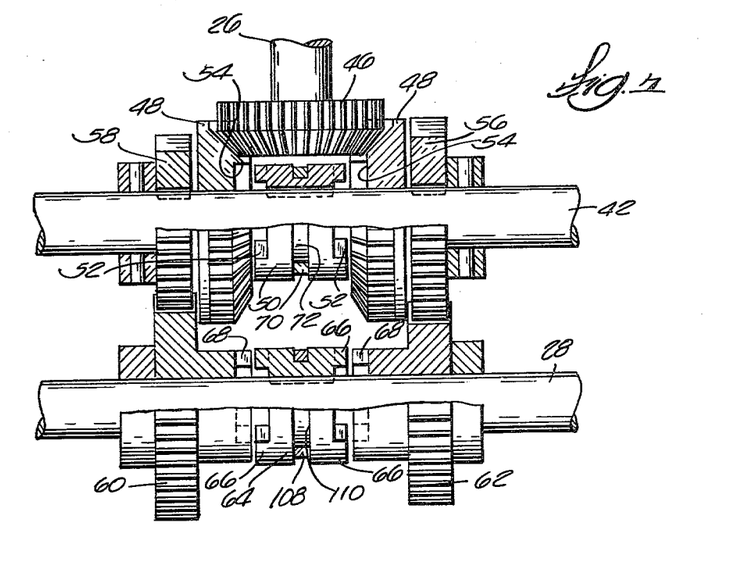
FIG. 7 is an enlarged plan view of the gear assembly of the mower transmission.

The transmission means 30 includes a housing 35 (FIG. 2) comprising a lower housing member 36 and an upper housing member 38. The drive shaft 28 extends through the housing 35 and is rotatably supported by bearings 40 supported between the side walls of the upper and lower housing members 36 and 38. Referring to FIG. 7, the transmission is shown as also including a second rotatable shaft 42 supported within the housing and in parallel spaced apart relation with respect to the drive shaft 28. The opposite ends of the rotatable shaft 42 are rotatably supported by bearings 44 (FIG. 2) supported between the side walls of the upper and lower housing members 36 and 38. The input shaft 26 extends through the front wall of the housing and is perpendicular to the drive shaft 28 and the second rotatable shaft 42. The end of the input shaft extending into the transmission housing 35 supports a bevel gear 46 in meshing engagement with two spaced bevel gears 48 supported on the rotatable shaft 42. The two spaced bevel gears 48 are each freely rotatable on the rotatable shaft 42 and are driven in opposite rotational directions by the bevel gear 46 secured to the end of the input shaft 26.

A forward and reverse shift dog 50 is supported on the rotatable shaft 42 between the spaced bevel gears 48 and is splined to the rotatable shaft 42 for rotation therewith and for slidable movement along the rotatable shaft 42 between the bevel gears. The forward and reverse shift dog 50 includes projecting lugs 52 which are selectively and alternatively receivable in notches 54 in the opposed faces of the spaced bevel gears 48 upon slidable movement of the shift dog 50 along the rotatable shaft 42 between the bevel gears 48 such that the bevel gears 48 and the shift dog 50 transmit rotation of the input shaft 26 to the rotatable shaft 42. Since the bevel gears 48 are driven in opposite directions, the direction of rotation of the second rotatable shaft 42 can be changed by moving the shift dog 50 from engagement with one of the bevel gears 48 to engagement with the other gear 48. A pair of gears 56 and 58 are respectively keyed to the opposite ends of the rotatable shaft 42, for rotation therewith, the gear 56 of the pair of gears being larger and having a greater number of gear teeth than the other gear 58.

The drive shaft 28 supports a pair of gears 60 and 62 in spaced apart relation, the gear 60 having a larger diameter than gear 62 and meshing with the smaller gear 58 driven by the rotatable shaft 42. The other gear 62 meshes with gear 56 driven by the rotatable shaft 42. Each of the gears 60 and 62 is freely rotatable with respect to the drive shaft 28. An axially slidable shift dog 64 is disposed between the gears 60 and 62 and is splined to the drive shaft 28 for rotation with the drive shaft 28 but is axially slidably movable along the drive shaft 28 between the gears 60 and 62. The shift dog 64 includes projecting lugs 66 which are selectively and alternatively engageable with notches 68 in the faces of the opposed gears 60 and 62 whereby rotation of one of the gears 60 or 62 is transmitted through the shift dog 64 to the drive shaft 28 for driving the drive shaft 28.

The larger gear 60 is shown as meshing with a smaller gear 58 on the rotatable shaft 42 and is accordingly driven at a lower rotational speed than gear 62 meshing with the larger gear 56 on the rotatable shaft 42. Accordingly, shifting of the shift dog 64 from engagement with gear 60 into engagement with gear 62 will cause an increase in the speed of rotation of the drive shaft 28. As a corollary, movement of the shift dog 64 from engagement with gear 62 to engagement with gear 60 will cause a decrease in the speed of rotation of the drive shaft 28.

Figure 8:
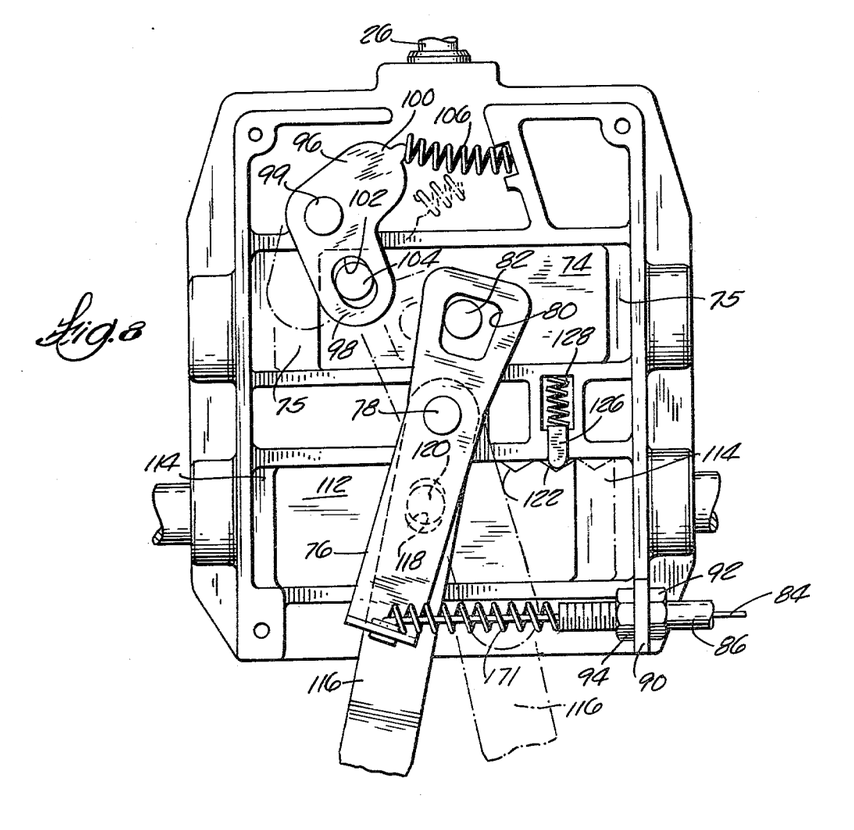
FIG. 8 is an enlarged cross-section plan view of the transmission housing.
Figure 9:
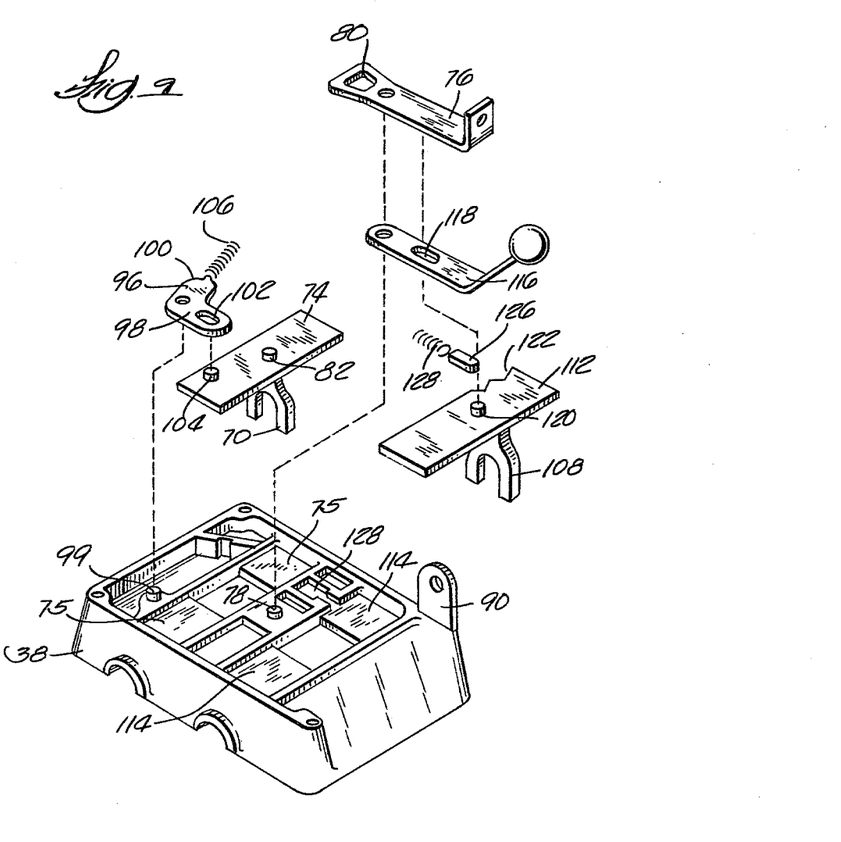
FIG. 9 is an exploded view of the transmission components shown in FIG. 8.

Referring to FIGS. 7 through 9, movement of the shift dog 50 is controlled by a forward and reverse shifter yoke 70 which is received in an annular groove 72 surrounding the circumference of the shift dog 50. The yoke 70 is attached to a forward and reverse shifter bar 74, the shifter bar 74 being slidably movable parallel to the rotatable shaft 42 and having its opposite ends supported on two spaced shelves 75 integral with the upper housing member 38 and on opposite sides of the shift dog 50. The shifter yoke 70 extends downwardly between the spaced shelves 75 from the shifter bar 74 to mounted at one end directly on the axle 24 and its other end is connected to the link 164.

To facilitate adjustment of the clearance between the wheel 21 and the drive roller 34 when the wheel 21 and drive roller 34 are disengaged, the link 164 is provided with a longitudinal slot 174 (FIG. 5) in its end opposite that connected to the lever arm 160, and the link 166 similarly includes a longitudinal slot 176 in its end opposite that pivotally mounted on axle 24. The links 164 and 166 are secured together by a bolt 178 extending through link 166 and received in the slot 174 and by an integral tab 180 extending from the link 164 and received in the longitudinal slot 176. Loosening the bolt 178 permits limited relative slidable movement of the links 164 and 166 for adjustment of the clearance between the wheels 21 and the drive roller 34.

Figure 6:
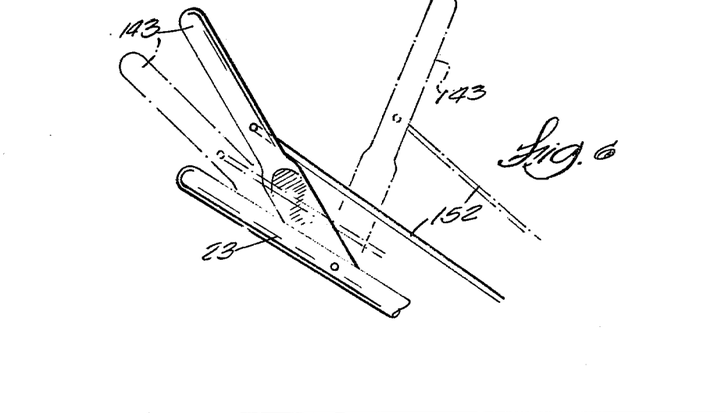
FIG. 6 is a fragmentary detail view in side elevation of the upper end of the mower guiding handle and showing the control handle mounted for movement relative to the guiding handle.

The shift lever 76 of the transmission 30 is also connected to the control handle 143 of the mower such that forward movement of the control handle 143 to its forward position shown in FIG. 6 causes the shift lever 76 to pivot to its forward drive position and rearward movement of the control handle 143 past the neutral position causes shift lever 76 to pviot to its reverse driving position. To facilitate such connection of the control handle 143 to the shift lever 76 of the transmission 30, the compound lever 156 also includes a downwardly extending lever arm 168 connected by pin 169 to an end of the inner wire 84 of the push-pull cable 86. The conduit of the push-pull cable 86 adjacent the lever arm 168 is rigidly supported by a bracket 170 attached to the yoke arm 136.

Figures 4, 5:
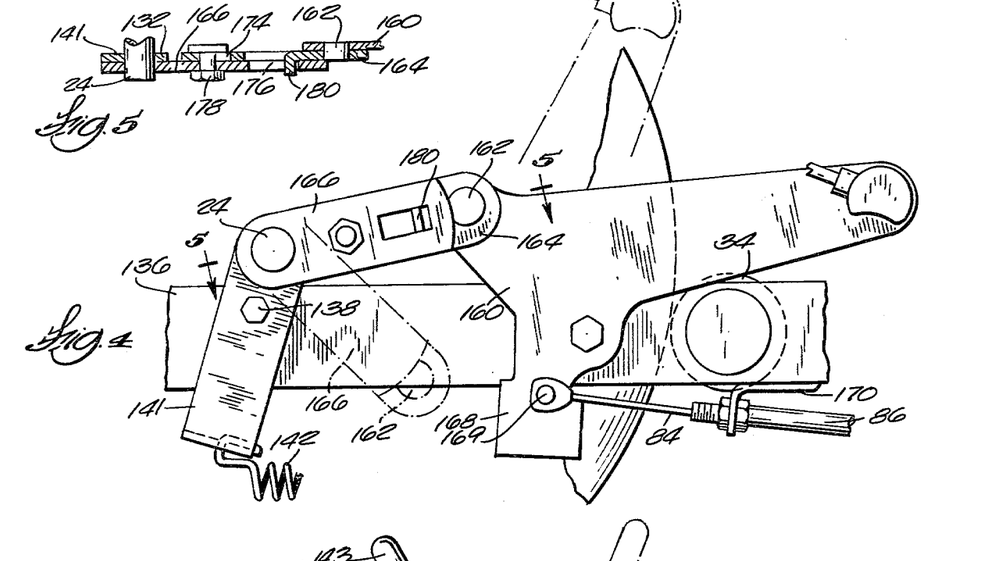
FIG. 4 is a view similar to FIG. 3 but showing the drive wheel in the forward drive position engaged with the drive roll.
FIG. 5 is a cross-section view taken along line 5—5 in FIG. 4.

When the control handle 143 is moved forwardly with respect to the guiding handle from the neutral driving position to the forward driving position, the actuator rod 152 is moved downwardly and the compound lever 156 and links 164 and 166 are moved to the position illustrated by the full line in FIG. 4, thereby pulling axle 24 forwardly toward a wheel engaging position, in which position the axle 24 is advanced so that the periphery of wheel 21 engages the friction driving roll 34. At the same time, the downwardly extending lever arm 168 will pull the inner wire 84 of the push-pull cable 86 causing pivotal movement of the shift lever 76 and thereby causing the transmission 30 to be shifted into the forward driving position.

Figure 1:
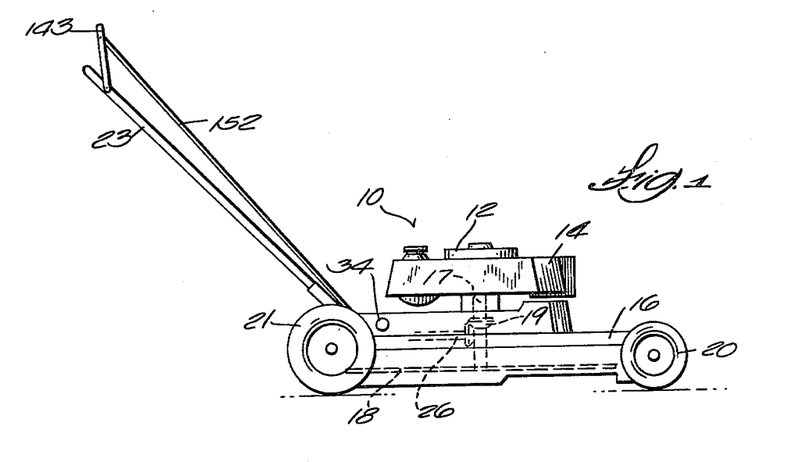
FIG. 1 is a side elevational view of a mower equipped with a transmission and embodying the invention.

Movement of the control handle 143 from the forward position to the neutral position effects an upward longitudinal advance of the actuator rod 152, thereby moving the compound lever 156 and the links 164 and 166 toward the neutral position shown in FIG. 1. During pivotal movement of the lever 156 from the forward to neutral position, the links 164 and 166 will be caused to move rearwardly toward the position shown in FIG. 3 whereupon the axle 24 is caused to be moved toward the rearward neutral position.

Movement of the control handle 143 from the neutral position toward the reverse position causes rotation of the compound lever 156 and movement of the links 164 and 166 to the position shown in phantom in FIG. 4. As in the shifting motion from neutral to forward, when the compound lever 156 is shifted from the neutral position to the reverse position, the rear axle 24 is pulled forwardly and wheels 21 and 22 engage friction drive rolls 34. At the same time, the downwardly extending lever arm 168 will move forwardly as viewed in FIGS. 3 and 4 pushing on the inner wire 84 of the push-pull cable 86 thereby causing pivotal movement of the shift lever 76 of the transmission into a reverse driving position shown in solid lines in FIG. 8. Such movement of the lever 76 is assisted by a compression spring 171 (FIGS. 2 and 8) compressed between the end of the conduit 86 and the end of the lever 76.

One of the features of the invention is that the transmission 30 is shifted between the forward and reverse driving modes only when the drive wheel 21 is disengaged from the drive roll 34, and the transmission is precluded from shifting when the drive wheel 21 is in driving engagement with the drive roll 34. Accordingly, the loads on the gears of the transmission 30 are reduced before the transmission is shifted between the forward and reverse driving modes. More specifically, when the control handle 143 is in the forward position shown in dashed lines in FIG. 6, the compound lever 156 is in the position shown in solid lines in FIG. 4 and the drive wheel 21 engages drive roll 34. The transmission shift lever 76 is also in the position shown in phantom in FIG. 8. When the control handle 143 is moved rearwardly toward the neutral position, the actuator rod 152 causes pivotal movement of the lever 156 toward the solid line position shown in FIG. 3 thereby causing pivotal movement of lever 132 and rearward movement of the axle 24 and drive wheel 21 away from the drive wheel 34. Movement of the control handle 143 toward the neutral position also causes the inner wire 84 of conduit 86 to move shift lever 76 from the forward position toward the the reverse position. However, the drive wheel 21 is disengaged from driving roll 34 before the lever 76 begins to cause shifting movement of the shift dog 50 of the transmission because the opening 80 in the end of the lever arm 76 for engaging the pin 82 is larger than the pin 82 and permits initial lost motion of the lever 76 before lever 76 acts on pin 82 to cause shifting of the shift dog 50 of the transmission 30 toward the reverse driving position.

As the central handle 143 is moved toward the reverse position shown in FIG. 6, the actuator rod 152 pivots the compound lever 156 toward the position shown in dashed lines in FIG. 4. Such movement of the compound lever 156 will cause the lever arm 168 thereof to move forwardly pushing the inner wire 84 to the position shown in FIG. 8 and moving lever 76 to the solid line position shown in FIG. 8 wherein the transmission 30 is in its reverse driving mode. The drive wheel 21 does not engage the drive roll 34 until the completion of the shifting movement. Accordingly, the shift lever 76 acts to cause shifting of transmission 30 into the reverse driving position before the drive wheel 21 is moved into driving engagement with drive roll 34.

When the control handle 143 is in its reverse driving position, the shift lever 76 assumes the position shown in solid lines in FIG. 8. When the control handle 143 is moved from the reverse driving position to the forward driving position, during initial movement of the compound lever 156 toward its neutral position, the links 164 and 166 and the return spring 142 cause immediate rearward movement of the drive wheel 21 away from the drive roll 34. Movement of the control handle 143 and consequent movement of the compound lever 156 also causes movement of the inner wire 84 of the push-pull cable 86 and movement of the shift lever 76. However, since the opening 80 in the end of lever 76 permits relative lost motion between the shift lever 76 and the pin 82 connected to the shift dog 50, the transmission does not begin to shift from the reverse to the forward drive position until the drive wheel 21 is disengaged from the drive roll 34.

engage the shifter dog 50. The shelves are spaced to define a rectangular opening therebetween receiving the yoke 70 therein and permitting movement of the shifter yoke 70 in the direction of the axis of the shaft 42. Referring to FIGS. 8 and 9, movement of the shifter bar 74 and the shifter yoke 70 is controlled by a shift lever 76, the shift lever 76 being pivotally attached intermediate its opposite ends by a pivot pin 78 extending upwardly from the upper housing member 38. One of the ends of the shift lever 76 includes an opening 80 therethrough receiving a pin 82 extending upwardly from the shifter bar 74. The opening 80 is larger than the pin 82 to permit overtravel of the shift lever 76 with respect to the shifter bar 74. One end of an inner wire 84 of a push-pull cable 86 (FIG. 2) is attached to the end of shift lever 76 opposite the end housing opening 80 for causing pivotal movement of the shift lever 76. The push-pull cable 86 is supported by a projection 90 extending upwardly from the upper housing member 38 and is retained therein by a pair of nuts 92 and 94.

A forward and reverse detent lever 96 is operable with the shifter bar 74 to selectively maintain the shift dog 50 in engagement with the selected one of the bevel gears 48. The detent lever 96 includes a pair of angularly disposed lever arms 98 and 100 and is pivotally attached to the upper housing member 38 intermediate the arms 98 and 100 by a pivot pin 99. The lever arm 98 includes a slot 102 for receiving a pin 104 extending upwardly from the shifter bar 74. A compression spring 106 bears against the end of the other lever arm 100 and is maintained in compression between the end of the lever arm 100 and the upper housing member 38. The compression spring 106 releasably maintains the detent lever 96 in either the solid line position shown in FIG. 8 or the dashed line position. When the detent lever 96 is in the solid line position shown in FIG. 8, the lever arm 98 of detent lever 96 maintains the shifter bar 74 in the solid line position and the shift dog 50 will be held in engagement with one of the bevel gears 48 by the yoke 70 which extends downwardly from the shifter bar 74. When the detent lever 96 is in the dashed line position shown in FIG. 8, the lever arm 98 of detent lever 96 maintains the shifter bar 74 in the dashed line position and the shift dog 50 will be held in engagement with the other bevel gear 48.

Movement of the shift dog 64 between selective and alternative engagement with the gears 60 and 62 is controlled by a speed selector shifter yoke 108 which is received in an annular groove 110 surrounding the circumference of the shift dog 64. The yoke 108 is attached to and extends downwardly from a speed selector shifter bar 112, the shifter bar 112 being slidably movable parallel to the drive shaft 28 and having its opposite ends supported on two spaced shelves 114 integral with the upper housing member 38 and on opposite sides of the shift dog 64. The shelves 114 define an opening therebetween for receiving the yoke 108 and for permitting movement of the yoke 108 in the direction of the axis of the drive shaft 28. The shifter yoke 108 extends downwardly between the spaced shelves 114 from the shifter bar 112 to engage the shift dog 64. Movement of the shifter bar 112 and the shifter yoke 108 is controlled by a speed selector shift lever 116 pivotally attached at one of its ends to the upper housing member 38 by the pivot pin 78. The other end of the shift lever 116 projects rearwardly from the transmission, and its projecting end forms a manually operable handle for shifting the transmission between low and high speeds. The shift lever 116 includes a slot 118 intermediate its opposite ends for receiving a pin 120 extending from the upper surface of the shifter bar 112. Lateral movement of the projecting end of the shift lever 116 will result in lateral movement of the shifter bar 112 and similar movement of the yoke 108 and shift dog 64.

The shifter bar 112 is provided with a pair of notches 122 in one of its edges and a detent pin 126 is slidably housed in a bore 128 in the upper housing member 38 and is biased into engagement with the notches 122 by a compression spring 130 thereby releasably restraining the shifter bar 112 and yoke 108 against movement.

The structure described above for shifting the transmission from forward to reverse is independent of the high and low speed shifting means. Accordingly, the transmission can be shifted from between forward and reverse when the transmission is in either the high or low speed driving modes. Similarly, the transmission can be shifted between high and low speeds when the transmission is in either forward or reverse.

Figure 2:
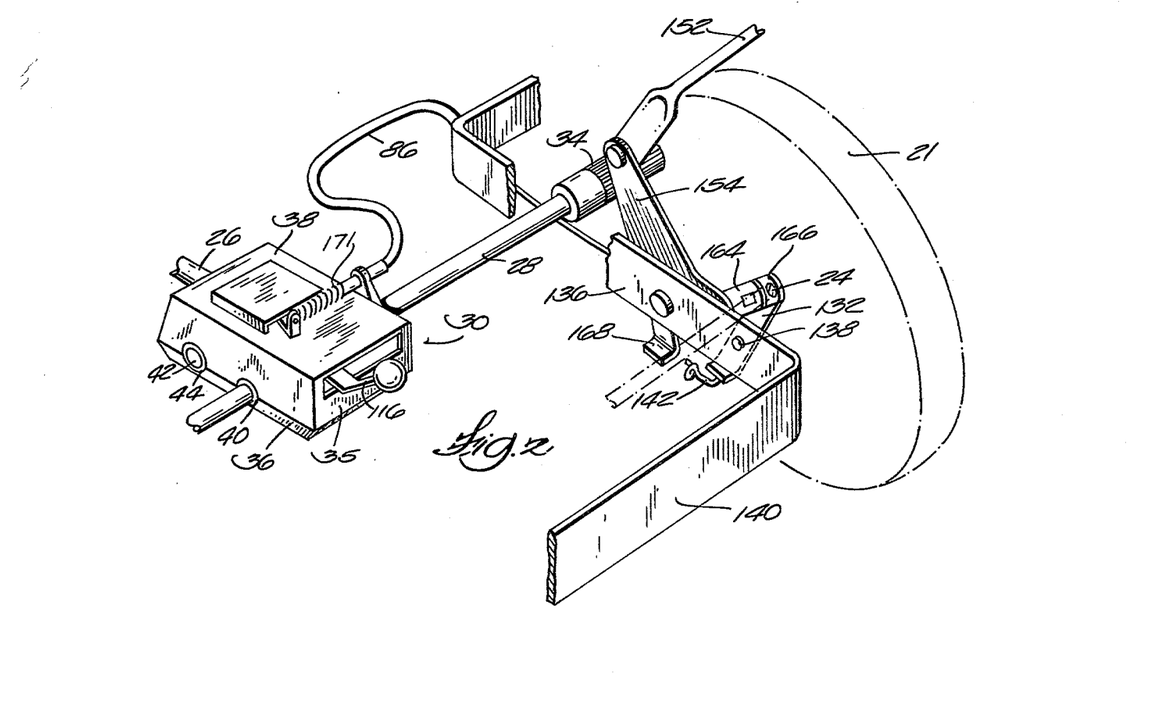
FIG. 2 is an enlarged fragmentary detailed view in perspective showing the mower drive transmission and the mounting of one of the mower wheels.
Figure 3:
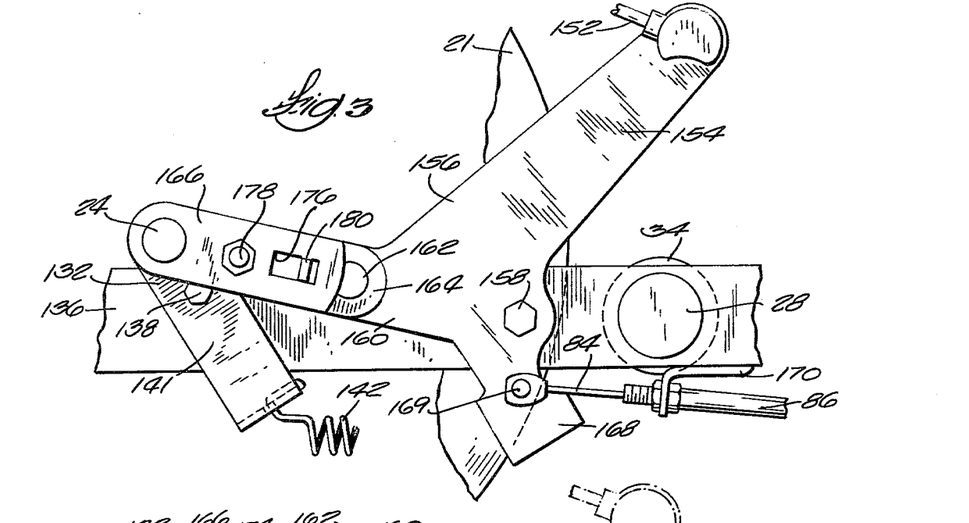
FIG. 3 is an enlarged fragmentary side elevational view of the drive wheel mounting and showing the drive wheel disengaged from the drive roll.

Referring to FIGS. 2–3, means are provided for moving the drive shaft 28 and the rear wheels 21 relative to each other between a drive position wherein the friction driving roll 34 frictionally engages the outer periphery of one of the rear wheels 21 and a non-driving position wherein the friction driving roll 34 is disengaged from the rear wheels 21. More specifically, the wheels 21 are rotatable with respect to the supporting axle 24 which is carried by levers 132 (one shown) pivotably mounted by a pivot 138 on arms 136 (one shown) of a yoke 140. The arms 136 of the yoke 140 are fixedly supported from the blade housing 16. The levers 132 project upwardly from the arms 136 and accommodate fore and aft movement of the axle 24 and the rear wheels 21 relative to the drive shaft 28 for respectively engaging the rear wheels 21 with the friction driving roll 34 and disengaging the rear wheels 21 from the friction driving roll 34. At least one of the levers 132 includes a downwardly extending lever arm portion 141, and a tension spring 142 is connected between the lever arm portion 141 and the blade housing 16 to urge the rear wheels 21 rearwardly with respect to blade housing 16 and toward the disengaged position.

Movement of the rear wheels 21 between the position where they are engaged with friction driving roll 34 and the position where they are disengaged from the friction driving roll 34 is effected by a control handle 143 (FIGS. 1 and 6) mounted on the guiding handle 23 and capable of limited independent movement with respect to the guiding handle 23. An actuator rod 152 is operatively connected at one of its ends to the control handle 143 and is connected at its lower end to the wheel axle 24 through a linkage arrangement.

Oscillatory movement of the control handle 143 with respect to the guiding handle 23 is used to transmit motion through the actuator rod 152. Thus, movement of the control handle 143 from the full line neutral position shown in FIG. 6 to the broken line forward position causes the actuator rod 152 to extend downwardly while movement of the control handle 143 from the full line neutral position to the dashed line reverse position causes the actuator rod 152 to move upwardly.

Referring to FIGS. 3–5, at its lower end the actuator rod 152 is pivotally connected to the end of a lever arm 154 of a compound lever 156. The compound lever 156 is pivotally connected to the yoke arm 136 by a bolt 158 and further includes a lever arm 160 pivotally connected at 162 to a link 164. Another link 166 is pivotally Various of the features of the invention are set forth in the following claims.

What is claimed is:

1. A self-propelled lawn mower comprising a blade housing, a plurality of wheels for supporting said blade housing, a blade mounted for rotation within said blade housing, a prime mover supported on said housing, a drive shaft mounted for rotation relative to said housing and adapted for connection to one of said wheels for driving thereof, transmission means mounted on said housing and including a rotatable input shaft drivingly connected to said prime mover, a pair of gears mounted co-axially with said drive shaft, means for connecting said input shaft to said pair of gears so as to drive one of said gears at a first speed and so as to drive the other gear at a second speed, and means for alternatively and selectively connecting said gears to said drive shaft for driving said drive shaft, said means including a shiftable element drivingly mounted on said drive shaft between said pair of gears and selectively and alternatively connectable to said gears.

2. A self-propelled lawn mower as set forth in claim 1 wherein said pair of gears are each supported on said drive shaft and are rotatable on said drive shaft.

3. A self-propelled lawn mower as set forth in claim 1 wherein said one wheel has a periphery and further including a friction driving roll mounted on said drive shaft for engaging said periphery of said one wheel, means on said housing mounting said one wheel for movement to and from engagement with said friction driving roll, a guiding handle connected to said housing, and means movably mounted on said guiding handle and connected to said means mounting said one wheel for moving said one wheel to and from engagement with said friction driving roll.

4. A self-propelled lawn mower comprising a blade housing, a plurality of wheels for supporting said blade housing, at least one of said wheels being adapted to serve as a drive wheel, a prime mover supported on said housing, a drive shaft mounted for rotation relative to said housing and a friction driving roll mounted on said drive shaft, means on said housing for mounting said drive wheel for movement to and from engagement with said friction driving roll, a guiding handle connected to said housing and means movably mounted on said guiding handle and connected to said means mounting said drive wheel for moving said drive wheel to and from engagement with said friction driving roll, means drivingly connecting said prime mover to said drive shaft and including transmission means mounted on said housing and selectively shiftable between a first driving mode and a second driving mode, and means for precluding shifting said transmission until disengagement of said drive wheel and said friction driving roll, said means for precluding shifting being connected to said means for mounting said drive wheel.

5. A self-propelled lawn mower as set forth in claim 4 wherein said means for mounting said drive wheel is movable from a forward drive position to a neutral position to a reverse drive position, said drive wheel being in engagement with said friction driving roll when said means for mounting said drive wheel is in said forward drive position and said reverse drive position and said drive wheel being out of engagement with said friction driving means when said means for mounting said drive wheel is in said neutral position.

6. A self-propelled lawn mower as set forth in claim 4 wherein said means for moving said drive wheel includes a lever arm connected to said wheel mounting means for moving said drive wheel to and from engagement with said friction driving roll and wherein said shifting means includes a cable having one end connected to said lever arm for movement with said lever arm and another end connected to said transmission for shifting said transmission.

7. A self-propelled lawn mower comprising a blade housing, a plurality of wheels adapted for supporting said blade housing and including a drive wheel having a periphery, a blade mounted for rotation within said housing, a prime mover supported on said housing, a drive shaft mounted for rotation relative to said housing, a friction driving roll mounted on said drive shaft for engaging said periphery of said drive wheel, means on said housing mounting said drive wheel for moving said drive wheel to and from engagement with said friction driving roll, a guiding handle connected to said housing, means movably mounted on said guiding handle and connected to said means mounting said drive wheel for moving said drive wheel to and from engagement with said friction driving roll, transmission means mounted on said housing and including a rotatable first gear drivingly connected to said prime mover, a pair of driven gears rotatably mounted in meshing engagement with said first gear and driven by said first gear in opposite directions, and means for alternatively and selectively connecting said driven gears to said drive shaft for rotatably driving said drive shaft in different rotational directions, and means for precluding shifting of said transmission until disengagement of said drive wheel and said friction driving roll, said means for precluding shifting being connected to said means for alternatively and selectively connecting one of said driven gears to said drive shaft and connected to said means for moving said drive wheel.

8. A self-propelled lawn mower as set forth in claim 7 wherein said means for moving said drive wheel includes a lever connected to said means mounting said drive wheel and adapted for moving said drive wheel to and from engagement with said friction driving roll, and further including a cable having one end connected to said lever for movement with said lever and another end connected to said means for alternatively and selectively connecting said driven gears to said drive shaft so as to move said connecting means to alternatively and selectively connect one of said driven gears to said drive shaft upon movement of said lever.

9. A self-propelled lawn mower as set forth in claim 7 wherein said means for moving said drive wheel is movable between a drive position and a neutral position, said drive wheel being in engagement with said friction driving roll when said means for moving said drive wheel is in said drive position and said drive wheel being disengaged from said friction driving roll when said means for moving said drive wheel is in said neutral position.

10. A self-propelled lawn mower comprising a blade housing, a plurality of wheels adapted for supporting said blade housing, a blade mounted for rotation within said housing, a prime mover supported on said housing, a drive shaft mounted for rotation relative to said housing, means operable between said drive shaft and one of said wheels for selectively drivingly engaging said drive shaft to said one wheel, and transmission means mounted on said housing and including a rotatable first gear drivingly connected to said prime mover, a pair of driven gears rotatably mounted in meshing engagement with said first gear and driven by said first gear in opposite directions, and shift means for alternatively and selectively connecting said driven gears to said drive shaft for rotatably driving said drive shaft in different rotational directions, and means connected to said shift means and to said means for selectively drivingly engaging said drive shaft to said one wheel for precluding shifting of said transmission when said one wheel is drivingly engaged by said drive shaft.

11. A self-propelled lawn mower as set forth in claim 10 wherein said transmission means further includes means for selectively and alternatively driving said drive shaft at two different speeds.

12. A self-propelled lawn mower as set forth in claim 10 wherein said means for alternatively and selectively connecting said driven gears to said drive shaft includes a second rotatable shaft rotatable with respect to said driven gears, means for selectively and alternatively drivingly connecting said driven gears to said second rotatable shaft and means for selectively and alternatively driving said drive shaft at two different speeds including a second pair of rotatably mounted gears, a first drive gear driven by said second rotatable shaft and driving one of said second pair of gears at a first speed, a second drive gear driven by said second rotatable shaft and driving the other of said second pair of gears at a second speed, and means for selectively and alternatively drivingly connecting one of said second pair of gears to said drive shaft.

13. A self-propelled lawn mower as set forth in claim 12 wherein said second pair of gears are respectively rotatably supported on said drive shaft for rotation independently thereof.

14. A self-propelled lawn mower as set forth in claim 8 and further including a guiding handle connected to said housing, and wherein said one wheel has a periphery and wherein said means for drivingly engaging said drive shaft and said one wheel comprises a friction driving roll mounted on said drive shaft for engaging said periphery, means on said housing mounting said one wheel for movement to and from engagement with said friction driving roll, and means movably mounted on said guiding handle and connected to said means mounting said one wheel for moving said one wheel to and from engagement with said friction driving roll.

15. A self-propelled lawn mower as set forth in claim 14 wherein said means for precluding shifting of said transmission is connected to said means for alternatively and selectively connecting said driven gears to said second rotatable shaft.

16. A self-propelled lawn mower as set forth in claim 10 wherein said shift means includes a second rotatable shaft rotatable with respect to said driven gears, means for selectively and alternatively drivingly connecting said driven gears to said second rotatable shaft, and means for selectively and alternatively driving said drive shaft at two different speeds including a second pair of rotatably mounted gears, a first drive gear driven by said second rotatable shaft and driving one of said second pair of gears at a first speed, a second drive gear driven by said second rotatable shaft and driving the other of said second pair of gears at a second speed, and means for selectively and alternatively drivingly connecting one of said second pair of gears to said drive shaft.

17. A self-propelled lawn mower as set forth in claim 1 wherein said means for connecting said input shaft to said pair of gears includes a second rotatable shaft drivingly connected to said pair of gears, a second pair of gears driven by said input shaft, and means for selectively and alternatively drivingly connecting said second pair of gears to said second rotatable shaft whereby said drive shaft can be reversibly rotated.

18. A self-propelled lawn mower as set forth in claim 11 and further including means operable between said drive shaft and one of said wheels for selectively drivingly engaging said drive shaft to said one wheel, and means connected to said shiftable element and to said means for selectively drivingly engaging said drive shaft to said one wheel for precluding shifting of said transmission when said one wheel is drivingly engaged by said shaft.

19. A self-propelled lawn mower as set forth in claim 1 and further including means operable between said drive shaft and one of said wheels for selectively drivingly engaging said drive shaft to said one wheel, and means connected to said shiftable element and to said means for selectively drivingly engaging said drive shaft to said one wheel for precluding shifting of said transmission when said one wheel is drivingly engaged by said shaft.

20. A self-propelled lawn mower as set forth in claim 18 and further including a guiding handle connected to said housing and means for shifting said transmission mounted on said guiding handle and connected to said means for alternatively and selectively connecting said driven gears to said drive shaft.

21. A self propelled lawn mower as set forth in claim 10 and further including a guiding handle connected to said housing, wherein said one wheel has a periphery, and wherein said means for drivingly engaging said drive shaft to said one wheel comprises a friction driving roll mounted on said drive shaft for engaging said periphery of said one wheel, means on said housing mounting said one wheel for movement to and from engagement with said friction driving roll, and means movably mounted on said guiding handle and connected to said means mounting said one wheel for moving said one wheel to and from engagement with said friction driving roll.

* * * * *